US006628939B2

(12) United States Patent
Paulsen

(10) Patent No.: US 6,628,939 B2
(45) Date of Patent: Sep. 30, 2003

(54) PERSONAL GAMING DEVICE

(75) Inventor: Craig Paulsen, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/882,558

(22) Filed: Jun. 15, 2001

(65) Prior Publication Data

US 2002/0193099 A1 Dec. 19, 2002

(51) Int. Cl.$^{7}$ .................................................. H04M 3/42

(52) U.S. Cl. .......................... 455/414; 455/412; 463/25; 463/40; 463/42; 463/46; 463/16; 463/18

(58) Field of Search ................................ 455/412, 414; 463/42, 40, 25, 46, 16, 17, 18, 19

(56) References Cited

U.S. PATENT DOCUMENTS

| | | | | | |
|---|---|---|---|---|---|
| 5,038,022 | A | * | 8/1991 | Lucero | 463/25 |
| 5,054,787 | A | * | 10/1991 | Richardson | 463/19 |
| 5,738,583 | A | * | 4/1998 | Comas et al. | 463/40 |
| 5,770,533 | A | | 6/1998 | Franchi | |
| 5,915,023 | A | * | 6/1999 | Bernstein | 380/24 |
| 5,999,808 | A | * | 12/1999 | LaDue | 455/412 |
| 6,001,016 | A | | 12/1999 | Walker et al. | 463/42 |
| 6,048,269 | A | | 4/2000 | Burns et al. | |
| 6,110,041 | A | | 8/2000 | Walker et al. | 463/20 |
| 6,270,410 | B1 | | 8/2001 | DeMar et al. | |
| 6,280,326 | B1 | | 8/2001 | Saunders | |
| 6,308,887 | B1 | * | 10/2001 | Korman et al. | 235/379 |
| 6,340,331 | B1 | | 1/2002 | Saunders et al. | |
| 6,416,414 | B1 | * | 7/2002 | Stadelmann | 463/42 |
| 2001/0041612 | A1 | * | 11/2001 | Garahi et al. | 463/29 |

OTHER PUBLICATIONS

Author Unknown, "Smart Cubicles," Business Week, Mar. 6, 2000.

Author Unknown, "Call My Agent," Business Week, Mar. 6, 2000.

Author Unknown, "The Tube," Business Week, Mar. 6, 2000.

* cited by examiner

*Primary Examiner*—William Trost
*Assistant Examiner*—Danh Le
(74) *Attorney, Agent, or Firm*—Weide & Miller, Ltd.

(57) ABSTRACT

The present invention comprises a personal gaming device. The personal gaming device of the invention is adapted to present a game to a player. In one embodiment, the gaming device includes a display screen, a processing unit including a processor and a memory, and a wireless communication interface associated with the processing unit. The wireless communication interface is adapted to receive data and provide it to the processing unit, and is adapted to transmit data provided by the processing unit. In one embodiment, the personal gaming device is associated with a gaming system including a game data server. The processing unit receives game data from a remote location, such as the game data server, via the wireless communication interface and utilizes the game data to present a game to the player, including presenting game video information on the display. In one embodiment, the gaming device includes a player input device, and the processing unit receives player input from the input device and transmits said input to a remote location via the wireless communication interface.

13 Claims, 2 Drawing Sheets

PERSONAL GAMING DEVICE

FIELD OF THE INVENTION

The present invention relates to gaming devices, and more particularly to a personal gaming device.

BACKGROUND OF THE INVENTION

Gaming is ever more popular, and casinos and other gaming establishments continually seek new and exciting ways to present games for play. Currently, games are generally presented on large free-standing gaming devices, such as the well known slot machine and video poker machines. Some games are presented at other than a gaming device, such as the table games of craps, blackjack and roulette. In addition, games such as keno and bingo may be played from tables in areas specially configured to present the game to players (such as in an area where personnel are arranged to pick up keno cards and called numbers are displayed on large displays).

A substantial disadvantage to the way such games are currently presented is that a player may participate in a game in only certain specified locations. For example, in order to play video poker, a player may be required to travel through a large hotel/casino to a specific gaming area where the video poker machine is located.

Gaming operators desire to provide to their customers greater accessibility to gaming devices and the opportunity to play games.

SUMMARY OF THE INVENTION

A personal gaming device adapted to present a game to a player is disclosed. In one embodiment, the personal gaming device is a part of a gaming system.

In one embodiment, the personal gaming device includes a display screen, a processing unit including a processor and a memory, and a wireless communication interface associated with the processing unit. The wireless communication interface is adapted to receive data and provide it to the processing unit, and is also adapted to transmit data provided by the processing unit. In one or more embodiments, the received information comprises game data generated at a remote location which is used by the gaming device to present a game to the player.

In one or more embodiments, the personal gaming device is a hand-held device which has a body which houses the processing unit and other electronics. The personal gaming device may include a card reader for reading a magnetic stripe or other encoded information, such as credit card information. The personal gaming device may also include a speaker for outputting game sound to a player.

In one embodiment, data may, instead of or in addition to being transmitted via the wireless communication interface, be transmitted and/or received through another type of communication interface, such as a cabled RS-232 or IEEE-1394 connection, or an infrared transmitter/receiver.

The personal gaming device preferably includes means for a player to provide play input. In one embodiment, the display may be touch-sensitive. The personal gaming device may also include buttons or include a microphone for accepting voice input.

In one embodiment, the personal gaming device is associated with a gaming system including a game data server. The processing unit receives game data from a remote location, such as the game data server, via the wireless communication interface and utilizes the game data to present a game to the player, including presenting game video information on the display. In one embodiment, the gaming device includes a player input and the processing unit transmits said input to a remote location via the wireless communication interface.

In one embodiment, a personal gaming device interface serves as an interface between the personal gaming device and one or more devices, including the game data server. The personal gaming device interface may also be associated with other networks and devices, including an Internet gateway, a hotel reservation system, a funds transaction network, or other networks and devices. In this manner, a player may use the personal gaming device to gain access to services, browse the Internet, and engage in other activities or obtain information than simply playing a game.

In a preferred embodiment, if the player wishes to play a game, the player is required to place a bet or ante to participate in winnings (i.e. a casino-type game or wagering game). In that event, a player provides credit, such as by swiping a credit card or a player tracking card associated with a player financial account. If the player's credit is verified, then the player is permitted to play a game or games as selected by the player. The game server generates game data regarding the game to be played, such as video and sound data. This information is transmitted to the personal gaming device, where game video and sound are presented to the player. As necessary, a player may provide input regarding a player's decisions relating to the game, such as via the touch-sensitive screen or a button.

Further objects, features, and advantages of the present invention over the prior art will become apparent from the detailed description of the drawings which follows, when considered with the attached figures.

DETAILED DESCRIPTION OF THE INVENTION

The invention is personal gaming device. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the present invention comprises a personal gaming device. The personal gaming device is adapted to present a game for play by a player. In a preferred embodiment of the invention, at least one game comprises a game of chance, and more particular such a game requiring that a player place a monetary wager in order to be entitled to play the game. In one or more embodiments, as detailed below, the personal gaming device is associated with a gaming network or server.

Figure 1:
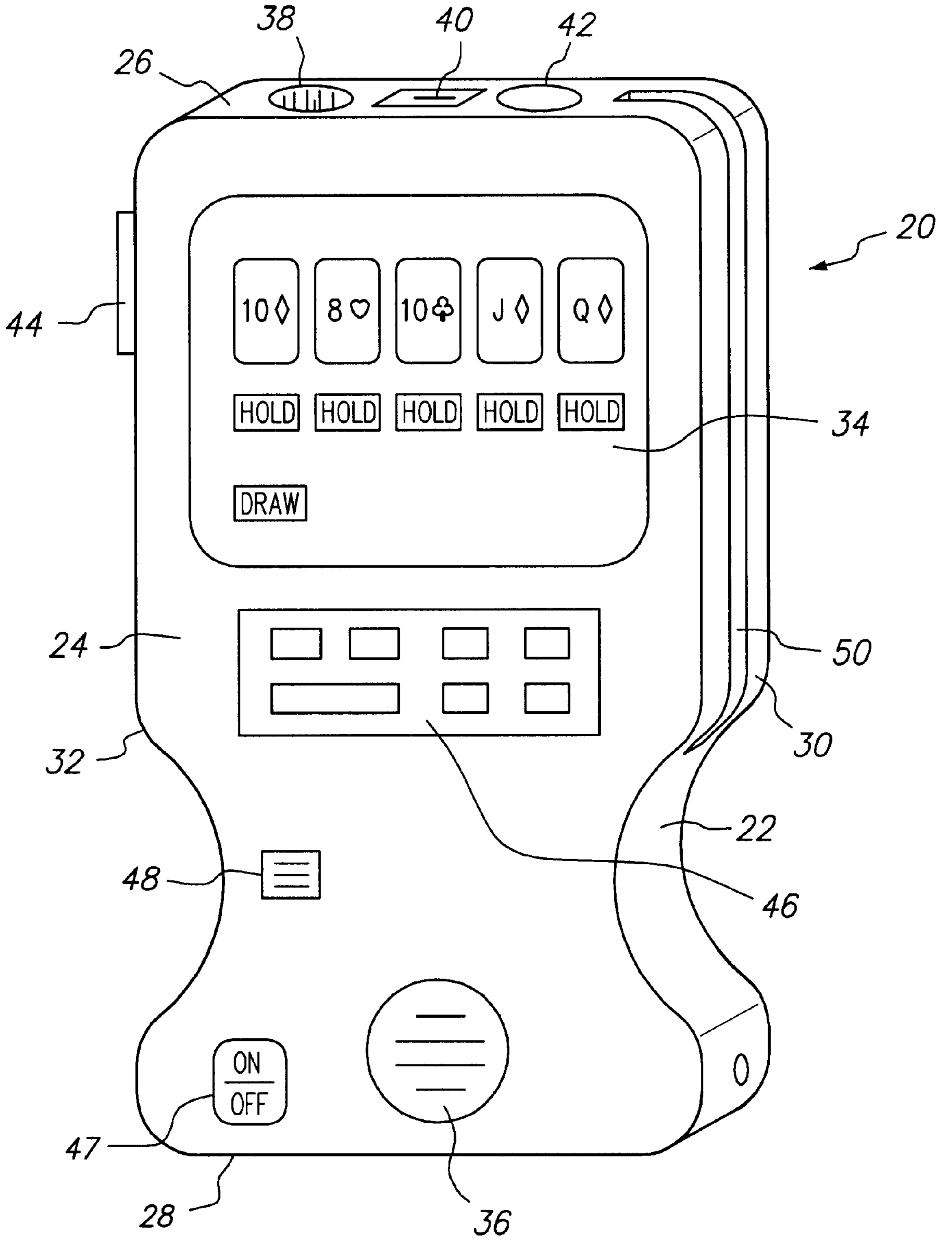
FIG. 1 is a perspective view of a personal gaming device in accordance with an embodiment of the invention.

FIG. 1 illustrates a personal gaming device 20 in accordance with one embodiment of the invention. In general, the personal gaming device 20 includes a body or housing 22. The body 22 may be constructed from a wide variety of materials and in a wide variety of shapes. In one embodiment, the body 22 is constructed from one or more molded polypropylene or other plastic components. The body 22 may be constructed of metal or a wide variety of other materials.

As illustrated, the body 22 is generally rectangular in shape, having a front side or face 24, a rear side or face (not visible), a top end 26, a bottom end 28, a first side 30 and a second side 32. Preferably, the body 22 defines an enclosed interior space (not shown) in which a variety of components are located.

In a preferred embodiment, the personal gaming device 20 is adapted to present video and sound game data to a player. As illustrated, the personal gaming device 20 includes a display 34. The display is located in the front face 24 of the body 22, thus facing upwardly towards a player. In a preferred embodiment, the display 34 comprises a liquid crystal display (LCD), and in particular, an LCD permitting touch-screen input. It will be appreciated that other types of displays may be provided.

The personal gaming device 20 also includes a sound generating device in the form of at least one speaker 36. In one embodiment, the speaker 36 is positioned beneath a top or cover portion of the body 22 having one or more perforations or apertures therein through which the sound may readily travel. As illustrated, the speaker 36 is located near the bottom end 28 of the body 22, generally opposite the display 34. It will be appreciated that the speaker 36 or additional speakers may be provided in a wide variety of locations, such as at one or both sides 30,32 of the body 22.

In a preferred embodiment, the personal gaming device 20 is adapted to send and/or receive data from another device. As such, the personal gaming device 20 includes one or more data input and/or output devices or interfaces. In one embodiment, the personal gaming device 20 includes an RS-232 data port 38 for transmitting and accepting data, such as through a cable extending between the device 20 and another device, such as a computer. In one embodiment, the personal gaming device 20 includes a USB data port 40 for transmitting and accepting data, also through a cable. In one embodiment, the personal gaming device 20 includes an infrared data transmitter/receiver 42 for transmitting information in wireless, infrared light form. In a preferred embodiment, the personal gaming device 20 includes another wireless communication device 44, such as a wireless communication device/interface operating at radio frequency, such as in accordance with the IEEE-802.11 b standard or the Bluetooth™ standard.

Preferably, a player is permitted to provide input to the personal gaming device 20, such as for playing a game. As stated above, one means of input may be through the display 34. The display 34 may also be arranged to accept input via a stylus or other device.

In one embodiment, the personal gaming device 20 includes a keypad 46. In one or more embodiments, the keypad 46 is a sealed keypad having one or more keys or buttons which may be activated by a player, such as by depressing the button with their finger.

The personal gaming device 20 includes a microphone 48. The microphone 48 is arranged to accept voice input from a player.

The personal gaming device 20 may include a card reader 50. As illustrated, the card reader 50 is located in a side 30 of the body 22 of the device 20. In a preferred embodiment, the card reader 50 comprises a magnetic stripe reader for reading information from a magnetic strip of a card. The card reader may also be adapted to write or store data to a magnetic stripe of a card. As illustrated, the card reader 50 includes a slot which is positioned in the side 30 of the device 20.

Other input devices may alternatively be provided or be provided in addition to those input devices described. For example, a player may be permitted to provide input through a joystick (not shown). The joystick may comprise a control element associated directly with the body 22 of the device 20. Alternatively, the joystick may be separate from the personal gaming device 20, and then be placed in communication therewith, such as by plugging in the joystick to a data port of the device 20. A smart card reader, optical reader or other input device may be provided for reading information from another element, such as a card, ticket or the like. The personal gaming device 20 may also include a keyboard or mouse.

The personal gaming device 20 may be battery-powered, such as with a rechargeable battery pack. An ON/OFF button 47 may be provided for controlling the power to the device 20.

Figure 2:
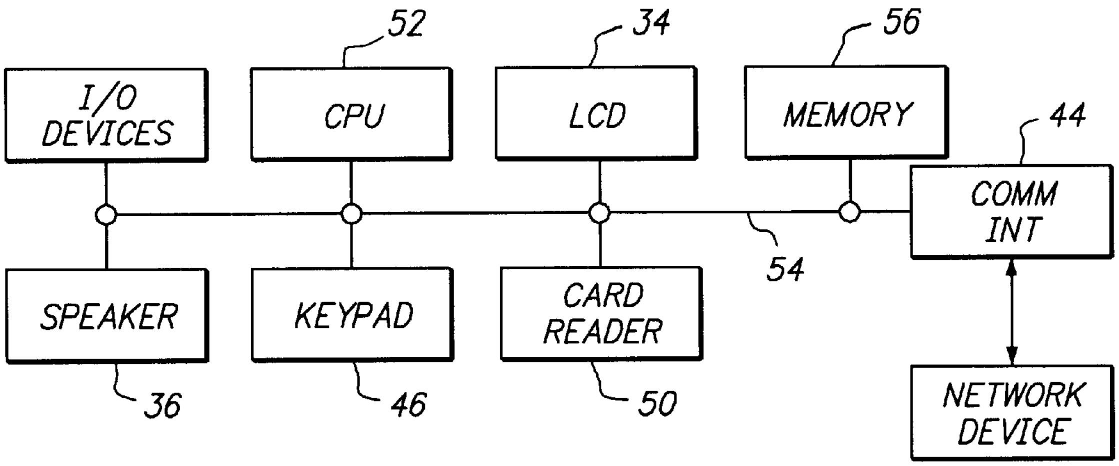
FIG. 2 is a block diagram of a component arrangement of the personal gaming device illustrated in FIG. 1.

Preferably, the personal gaming device 20 includes control means for controlling the operation of the device 20, including accepting input and providing output. One embodiment of such a control means is illustrated in FIG. 2.

As illustrated, the personal gaming device 20 preferably includes a computing environment serving as the control means. The computing environment includes a central processing unit 52. The central processing unit 52 preferably comprises a microprocessor, such as those well known and manufactured by such companies as Intel, AMD and Sun Microsystems, Inc.

The central processing unit 52 is associated with a bi-directional system bus 54. The system bus 54 may contain, for example, thirty-two address lines for addressing a video memory or main memory. In addition, the system bus 54 preferably includes a thirty-two or sixty-four bit data bus for transferring data between and among components associated with the bus 54. Alternatively, multiplex data/address lines may be used instead of separate data and address lines.

The display 34 is coupled to the bus 54. In one embodiment, a video memory (not shown) is provided in association with the bus 54. The video memory may be dual-ported video random access memory. The video memory is preferably coupled to and arranged to drive the LCD display 34. Of course, the video memory might be coupled to a CRT or other suitable display device. A memory 56 is associated with the system bus 54. In one embodiment, the memory 56 comprises dynamic random access memory (DRAM), synchronous DRAM or other forms of random access memory. The memory 56 may have other forms as well, such as electronically erasable programmable read only memory (BEPROM). Preferably, the memory 56 is of the type which permits data to be written thereto and read therefrom.

As illustrated, the variety of input and output devices are associated with the system bus 54, and thus the other components associated with the bus. As illustrated, the speaker 36, keypad 46 and card reader 50 are associated with the system bus 54. A variety of data input/output devices ("I/O Devices") may also associated with the system bus 54, such as, though not specifically illustrated, the RS-232 port 38, the USB 40, and the infrared communication transmitter/ receiver 42. As will be appreciated, these devices/elements may operate in accordance with different protocols and have different architectures, and have appropriate interfaces provided for communicating with the system bus 54. For example, the infrared transmitter/receiver may have different layers, including a physical layer including the light-emitting device, and link and other layers which include software and/or hardware, as is known. A variety of other input/output devices may be associated with the personal gaming device 20, as now known or later developed.

Preferably, as stated above, the personal gaming device 20 includes a wireless, radio frequency, communication interface operating in accordance with the IEEE 802.11b or Bluetooth™ standard. The architectures/protocols of such wireless communication interfaces are well known and thus will not be described in detail herein. In general, however, such an interface 44 permits two-way data communication. As described in detail, the personal gaming device 20 may be permitted to communicate with a wide variety of devices/systems, including at least one device associated with a gaming network.

In accordance with the invention, the personal gaming device 20 can send data and receive data, including program code, through the communication interface 44 (or the other input/output devices, such as the infrared transmitter/receiver). As one example described in more detail below, a gaming server may transmit requested code for an application via a transceiver to the communication interface 44 of the personal gaming device 20. The received code may be executed by the central processing unit 52 as it is received and/or be stored in the memory 56 for later execution.

In one embodiment, the personal gaming device 20 may include a mass data storage device (not shown) such as a hard drive, CD-ROM or the like. In one or more embodiments, the memory 56 may comprise a smart card or similar easily removable (and replaceable) device. In such event, data, such as operating code, may be associated with the personal gaming device 20 via a CD-ROM placed in a CD-ROM drive or by insertion of a coded smart card.

In one or more embodiments, the personal gaming device 20 is associated with a gaming system. In a preferred embodiment, the personal gaming device 20 is only operable or at least incapable of presenting certain functions or features unless associated with such a system.

Figure 3:
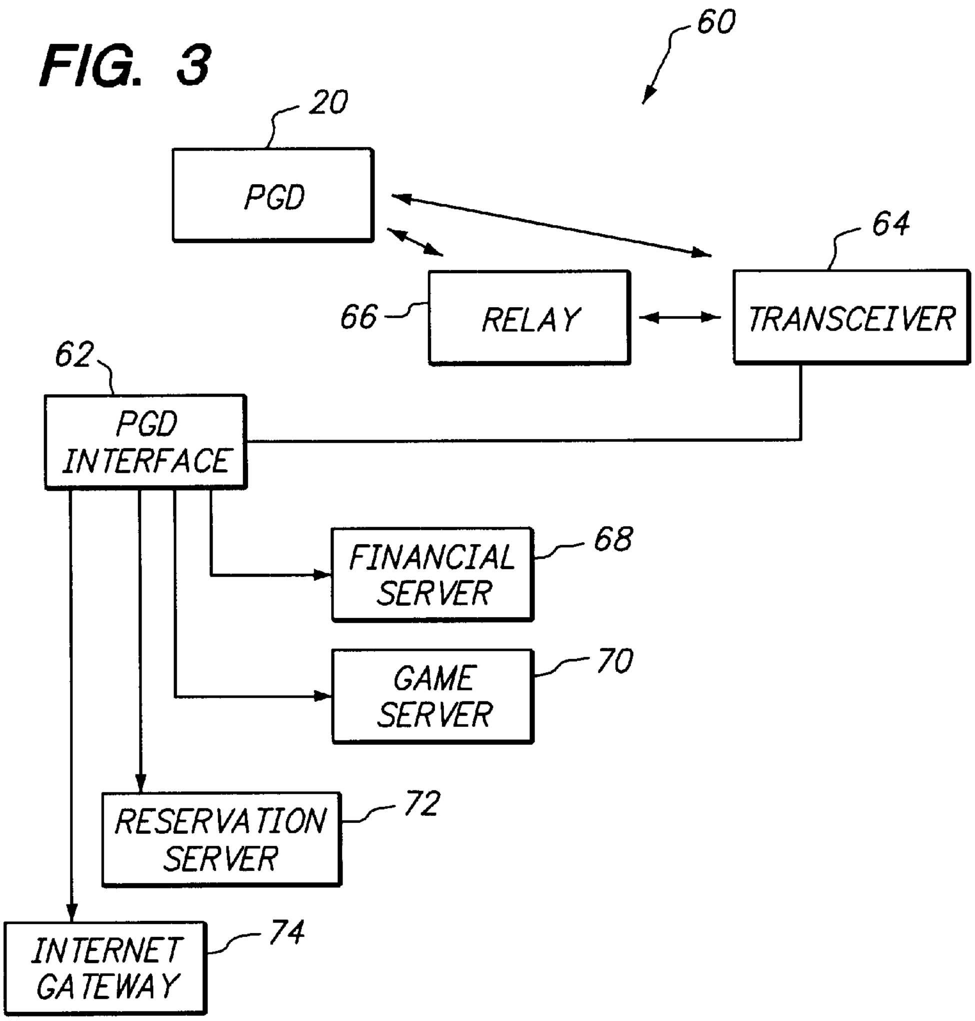
FIG. 3 is a schematic of a gaming system including a personal gaming device in accordance with the invention.

A gaming system 60 in accordance with one embodiment of the invention is illustrated in FIG. 3. As illustrated therein, the gaming server 60 includes a personal gaming device interface 62. The personal gaming device interface 62 serves as a gateway to data communications between the personal gaming device 20 and various networks, servers and other devices. In one embodiment, data communications between the personal gaming device 20 and the personal gaming device interface 62 is via a transceiver 64 associated with the personal gaming device interface 62. In general, the transceiver is arranged to receive information from the personal gaming device interface 62 and transmit it to the personal gaming device 20, or receive information from the personal gaming device 20.

As illustrated, a personal gaming device 20 may communicate directly with the transceiver 64. It will be appreciated, however, that limitations exist as to the range over which such data can be accurately transmitted. Therefore, in one or more embodiments, one or more relays 66 may be provided for receiving and re-transmitting the data to the appropriate location.

As stated above, in a preferred embodiment, the personal gaming device interface 62 serves as a gateway or interface between the one or more personal gaming devices 20 and one or more other devices, systems or networks. As illustrated, in one embodiment, the personal gaming device interface 62 is associated with a financial server 68. The financial server 68 may be a computer or be associated with a computer having a processing unit and one or more data files. The financial server 68 is preferably arranged to confirm financial transaction data. For example, in order for player to be permitted to play a game using the personal gaming device 20, the player may be required to place a bet. In one embodiment, the bet may be placed using a credit card. In such event, the player may swipe their credit card using the card reader 50 associated with the personal gaming device 20. This data may be transmitted to the financial server 68 for confirmation (and as is well known in the art, generation of financial transaction data, such as a transaction date, time and value).

In one embodiment, the system 60 includes a game server 70. As illustrated, the game server 70 is associated with the personal gaming device interface 62. In one or more embodiments, the game server 70 is, or is associated with, a computing device, such as a processor adapted to execute game code. Preferably, the game server 70 is arranged to provide game data to the personal gaming device 20 via the interface 62. This game data may comprise video data for generating an image on the display 34 of the personal gaming device 20, and sound data for generating sound emitted by the speaker 36. The game server 70 is preferably also adapted to receive input from a player, such as a player selection during the play of a game.

In one embodiment, a reservation server 72 is connected to the personal gaming device interface 62. The reservation server 72 may be arranged to accept reservation selections, and provide information regarding available hotel rooms, rates, shows, restaurants and the like for use by a player of the personal gaming device 20 in making a reservation selection.

In one embodiment, the personal gaming device interface 70 is connected to an Internet gateway 74. This Internet gateway may comprise a computing device which is coupled to the Internet, such as through an Internet service provider.

The personal gaming device interface 62 may be arranged to facilitate communication between devices, systems and networks operating in accordance with differing protocols. For example, the personal gaming device interface 62 may be arranged to communicate with the personal gaming device 20 in accordance with a wireless IEEE 802.11b standard. On the other hand, the personal gaming device interface 62 may be arranged to communicate with the financial, game and reservations servers 68,70,72 operating in accordance with an IEEE 1394 ("Firewire") protocol, or Ethernet or the like. In addition, the personal gaming device interface 62 may be arranged to communicate with the Internet gateway 74 in accordance with a PPP or SLIP protocol.

As will be appreciated, the data which is transmitted to and from the personal gaming device 20 is preferably provided with an address or other identifier of the intended destination of the information. This address information is used by the personal gaming device interface 62 for directing data received from a personal gaming device 20 to a particular destination, such as the game server 70. Likewise, data which is directed to a personal gaming device 20 preferably has an address associated therewith for identifying the particular intended destination. It will be appreciated that more than one personal gaming device 20 may be associated with the interface 62, such that a unique address or identifier is necessary to properly associate data with its intended destination.

In one or more embodiments, the personal gaming device 20 may be programmed with a specific address or other security information, such as a password to prevent association of unauthorized devices with the system 60. In one embodiment, each personal gaming device 20 may implement a data encryption/decryption scheme such as RSA or DSA. Some or all of the information or data which is transmitted to or from the personal gaming device 20 may be encrypted to prevent its interception and use by unauthorized users. The encryption/decryption key(s) may be associated with the personal gaming device 20 with a module or similar removable device. A user may be required to obtain a module in order for the device 20 to function.

A method of using a personal gaming device such as the personal gaming device 20 illustrated in FIG. 1 will now be described.

First, a player obtains a personal gaming device 20. In one arrangement, a casino may allow a player to check out a personal gaming device 20. For example, a casino may have a central desk or station at which a player may obtain a personal gaming device 20. In one embodiment, a player may be required to leave a deposit to check the device out, helping ensure that the player will return the device when they are done using it.

In one embodiment, a player may also be permitted to purchase a personal gaming device 20. Having obtained a device, the player may be able to use the device at a variety of locations. In another embodiment, a player may be required to rent the device, such as by paying a fee for the time which the player uses it.

Once the player has obtained a personal gaming device 20, the user may be permitted to engage in one or more activities. In one embodiment, some activities may be presented by the personal gaming device 20 itself. For example, software code may be stored in the memory 56 for execution by the processing unit 52 for permitting certain functions, such as the playing of music, display of "how to use" or "help" information and the like.

Preferably, however, the number of functions which are fully supported by the personal gaming device 20 are limited. This limits the total amount of memory which the personal gaming device 20 needs to include. Thus, one or more functions or activities are supported only by associating the personal gaming device 20 with a gaming system such as that illustrated in FIG. 3.

In one embodiment, when the personal gaming device 20 is turned on, such as with the ON/OFF button 47, the personal gaming device 20 is adapted to send a signal to the personal gaming device interface 62 or other device for establishing a communication link. Once this communication link is provided, data may be transmitted to and from the personal gaming device 20 and the other networks/systems/devices.

Once a communication link is established, master menu information may be transmitted from the personal gaming device interface 20. For example, casino personnel may generate menu information and load it into a memory associated with the personal gaming device interface 62. Upon a personal gaming device 20 establishing a communication link with the personal gaming device interface 62, the menu information may be transmitted to the personal gaming device 20 for display thereon.

A player may then select one or more activities or functions from the displayed menu. Input may be provided by touching an area of the screen 34 associated with a menu item, providing keypad entry, or in other manners. In one embodiment, a player may be permitted to engage in activities or obtain services at no charge. For example, a player may be permitted to access the Internet using the personal gaming device 20 at no charge to the player. The player may also be permitted to obtain show, ticket, hotel, restaurant and other information and place reservations and the like at no charge.

In one or more embodiments, a player is required to pay to engage in one or more activities. In a preferred embodiment, a player is required to place a bet or ante in order to play one or more games. Of course, one or more games may be provided for free. Alternatively, a player may be required to place a bet or ante if the player is to be entitled to an award or winning if the outcome of the game is a winning outcome. In another embodiment, the casino or other party may give away prizes. For example, a player may be permitted to play in one or more complimentary games, with the player being awarded a prize (money, a hotel night stay, free dinner or the like) in the event the player is a winner of the game.

In the event the player is required to place a bet or desires to place a bet, the player may do so in a variety of manners. In one embodiment, the player may provide credit or value using a credit card. As described above, the player may swipe their credit card with the card reader 50. Data read from the player's card may be transmitted from the personal gaming device 20 to a financial server for verification. In another embodiment, a player may place a deposit with the gaming operator and be provided with a player card. For example, when the player checks out the personal gaming device 20, the player may place a monetary deposit or credit deposit. The deposit may be associated with a player's account and/or a player card. The deposit data may be stored in a master database, with a particular file being assigned an identifier. That identifier may be stored on the player card. Later, the player may swipe their player card. The read identifier may be transmitted and the deposit data obtained from the corresponding file.

A variety of other methods may be provided for the player providing the credit or value. For example, a player may be provided with an encoded ticket (bar code or the like), or a smart card or other element having data which provides verification of the player's credit or payment.

In one embodiment, the player may select the amount of the bet or ante by providing input to the personal gaming device 20. For example, once a player has selected a game for play, a gaming server may transmit bet screen data. The bet screen may indicate to a player that the player may bet anywhere from 1 to 5 credits, each credit having a value (such as \$0.25 US, \$1.00 US or the like). The player may select the desired bet. Upon receiving the data, the game server may instruct the player to provide the necessary credit, such as by swiping the credit card.

In one embodiment, a player may create a bank of credits from which the player may place bets. For example, a player may be permitted to place a large deposit with the operator or may use their credit card to create a large deposit. This deposit may be associated with an account of the player. The total credit of the player may be displayed by the personal gaming device 20. Such an arrangement may be similar to that of current game machines were a player may provide a \$20 bill to generate 20 \$1 credits, with the number of credits indicated to the player.

Once verification has been provided of the player's bet or ante, the player may be permitted to play the game. In a preferred embodiment, the game data is generated by the game server 70 and transmitted to the personal gaming device 20. FIG. 1 illustrates an embodiment of a personal gaming device 20 which is displaying a screen of a game of video poker, the screen displaying cards and instructions to the player. The player may provide input to the game server 70 as necessary.

In one embodiment, a player may be permitted to raise their bet or ante, or otherwise place other bets, during the course of the game. In such event, the player may provide credit as described above.

Depending on the outcome of the game, an award or winning may be provided to the player. In one embodiment, a winning is associated with an account of the player or may be credited to the credit card account of the player. In another embodiment, the device 20 may include a ticket printer or other device for issuing an element having the value associated therewith (or at least data regarding the value the player won).

A player may play any number of games, switch to other activities, or return the personal gaming device 20 at any time.

In one or more embodiments, means may be provided for ensuring that the personal gaming devices 20 are returned and not stolen. First, in one embodiment, the personal gaming devices 20 may be restricted to use in a particular area. For example, use of the devices may be permitted only in a particular game room. By monitoring the exits, the theft or loss of the personal gaming devices 20 may be controlled.

In another embodiment, a "fence" may be created which, if the personal gaming device 20 is crossed over, results in one or more security measures being activated. The fence may comprise one or more emitters which emit a signal detectable in a restricted area by the personal gaming device 20. Upon detecting the signal, the personal gaming device 20 may be arranged to generate a loud audible signal (such as by speaker 36) warning that the personal gaming device 20 is being removed from the authorized area. The personal gaming device 20 may also be arranged to display a warning message to a player. In one embodiment, the memory of the personal gaming device 20 may be erased, preventing the player's further use of the device (without returning it back to the gaming operator for resetting the device) and protecting the gaming operator by preventing the player from obtaining any critical information which would otherwise be associated with the device.

In this regard, one advantage of the personal gaming device 20 of the preferred embodiment of the personal gaming device 20 is that gaming code is not stored at the personal gaming device 20. In particular, the gaming code which is utilized to present and play the game is stored remotely, such as at the game server 70. Only game data is transferred to the personal gaming device 20. Therefore, even theft of the device would not result in the thief obtaining proprietary, important game code.

In one or more embodiments of the invention, the personal gaming device 20 may be "customized" for a particular player. In one embodiment, a player may create a player account. This account may not only include credit information, but may include player preference information. For example, a player may designate that they prefer to play a particular game and place bets in a particular denomination. These preferences may be indicated by a player on a sign-up sheet which is then used to create the account, or by input to a program interface which player's may use to generate their accounts.

In one embodiment, the player is issued a player card which includes information regarding the player's account. When the player swipes their player card using the card reader 50 of the personal gaming device 20, information may be provided regarding the player's account, such as the account number. The player's account may then be accessed and the information therein be used to personalize the gaming device 20. For example, the player's account information may be used by the personal gaming device interface 62 to generate a personalized menu for display, or to automatically present the player's favorite game as customized with the player's default bet.

In accordance with the invention, a player may be permitted to access a wide variety of goods or services using the personal gaming device 20 other than those particularly described above. For example, a player may be permitted to access a room charges account to view the current room charges associated with their stay at a hotel. A player may be permitted to request their car from a valet service, such as by entering a valet stub identification number. A player may be permitted to obtain a wide variety of other goods, services or information, or engage in a wide variety of other activities.

The personal gaming device 20 of the present invention has numerous advantages. First, a player is permitted to use a personal gaming device 20 to participate in a game at other than a fixed location. The player may play a game at a location which is removed from the location of traditional fixed gaming devices. These locations may include the player's hotel room, a restaurant, a bar or lounge, a sports book, a hotel/casino pool area, and a wide variety of other areas remote from the fixed gaming devices. Of course, the player may also utilize the personal gaming device to participate in a game in the area of stationary gaming machines, and may even participate in games played on both the personal gaming device and a stationary machine at the same time.

Another advantage of the personal gaming device is that the device is easily transportable. The player may take the device with them as they travel from location to location, such as from a restaurant to the player's room. Thus, while the player is engaging in other activities, such as eating or moving from one location to another in a casino, the player's ability to play a game is not interrupted.

Another advantage of the personal gaming device is that its configuration results in ease of use. The personal gaming device is preferably hand-held, and wireless and can thus easily be transported by a player. In addition, the personal gaming device 20 is simplistic in design to make its use easily understandable by even inexperienced players. In general, necessary acts by a player may be prompted, such as with instructions displayed on the display or provided audibly through the speaker 36.

The personal gaming device 20 is also versatile, and is not limited to presenting only a game for play by a player. As noted, a player or user of the personal gaming device 20 may utilize the personal gaming device to access a wide variety of information and obtain a wide variety of services. The player may access the Internet, obtaining information therefrom (such as news and weather) and may obtain goods and services there through (such as by placing orders with vendors having websites). The player may make room, show or restaurant reservations and obtain hotel/casino information.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A method of presenting wagering games in a casino environment comprising:

providing at least one personal gaming device, said personal gaming device comprising a hand-held gaming device including a display adapted to display game information, a processor configured to execute game code, a memory adapted to store game code to be executed by said processor, and a wireless communication interface for receiving information and transmitting information;

providing a game server configured to transmit game code to said at least one personal gaming device;

providing a financial server configured to confirm financial transaction data;

accepting financial account information at said personal gaming device;

transmitting said financial account information to said financial server;

confirming financial transaction data at said financial server;

transmitting game code from said game server to said personal gaming device;

storing said game code at said memory of said personal gaming device;

executing said game code with said processor of said personal gaming device to present said wagering game;

displaying said wagering game on said display of said personal gaming device;

determining the outcome of said wagering game; and awarding a winning to said player if said outcome is a winning outcome.

2. The method in accordance with claim 1 including the steps of providing said personal gaming device with a card reader and wherein said step of accepting financial account information comprises reading information from a player card with said card reader.

3. The method in accordance with claim 2 wherein said player card is a credit card.

4. The method in accordance with claim 2 wherein said player card is a player tracking card.

5. The method in accordance with claim 2 including the step of storing player account information at said financial server and wherein said step of confirming financial transaction data comprises confirming the existence of credits associated with said player's account.

6. The method in accordance with claim 5 including the step of transmitting information regarding a number of credits to said personal gaming device.

7. A method of playing a wagering game in a casino environment comprising the steps of:

checking out to a player a hand-held gaming device for use for a limited period of time within said casino environment;

activating said hand-held gaming device;

displaying information to said player with a display of said hand-held gaming device, said information regarding one or more activities said player may engage in;

establishing a wireless communication link with a game device interface;

accepting player information at said hand-held gaming device;

transmitting said player information to a financial server via said communication link with said game device interface;

utilizing said player information to verify credit belonging to said player for use in placing a wager to play a game;

transmitting credit information to said hand-held gaming device;

accepting wager instructions from said player at said hand-held gaming device in order to initiate a wagering game;

transmitting wager instructions from said hand-held gaming device to said financial server via said communication link with said game device interface;

transmitting game code from a game server to said hand-held gaming device via said communication link with said gaming device interface;

storing said game code at a memory of said hand-held device;

executing said game code with a processor of said hand-held device;

displaying game information to said player with said display of said hand-held gaming device; and determining the outcome of said game.

8. The method in accordance with claim 7 wherein said step of accepting player information comprises reading information from a credit card with a card reader of said hand-held gaming device.

9. The method in accordance with claim 8 wherein said step of utilizing said player information to verify credit comprises utilizing said information from said credit card to establish the existence of credit provided by another entity which may be utilized by said player.

10. The method in accordance with claim 7 wherein said step of accepting player information comprises reading information from a player tracking card with a card reader of said hand-held gaming device.

11. The method in accordance with claim 10 wherein said step of utilizing said player information to verify credit comprises utilizing player identification information obtained from said player tracking card to access credit information stored in a player account.

12. The method in accordance with claim 7 wherein said step of transmitting credit information comprises transmitting information regarding a number of credits.

13. The method in accordance with claim 7 including the step of debiting a number of credits associated with said financial account by a number of credit wagered by said player in accordance with said wager instructions.

* * * * *